US010567256B2

(12) United States Patent
Fujii

(10) Patent No.: US 10,567,256 B2
(45) Date of Patent: Feb. 18, 2020

(54) INFORMATION PROCESSING SYSTEM, PORTABLE INFORMATION TERMINAL, INFORMATION PROCESSING DEVICE, AND NON-TRANSITORY COMPUTER READABLE RECORDING MEDIUM

(71) Applicant: Konica Minolta Business Technologies, Inc., Chiyoda-ku (JP)

(72) Inventor: Masato Fujii, Nagaokakyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 1366 days.

(21) Appl. No.: 13/755,038

(22) Filed: Jan. 31, 2013

(65) Prior Publication Data
US 2013/0212261 A1 Aug. 15, 2013

(30) Foreign Application Priority Data
Feb. 15, 2012 (JP) .................................. 2012-030056

(51) Int. Cl.
*H04L 12/26* (2006.01)
*H04N 1/00* (2006.01)
*G06F 9/50* (2006.01)

(52) U.S. Cl.
CPC ........ *H04L 43/0876* (2013.01); *G06F 9/5072* (2013.01); *H04N 1/00204* (2013.01);
(Continued)

(58) Field of Classification Search
CPC ... H04L 29/08072; H04L 29/06; H04L 43/00; H04L 12/2602; H04L 41/22;
(Continued)

(56) References Cited

U.S. PATENT DOCUMENTS 8,189,225 B1 * 5/2012 Lo ........................... G06F 3/122
358/1.15
8,370,143 B1 * 2/2013 Coker ................... G06F 17/276
704/240
(Continued)

FOREIGN PATENT DOCUMENTS

EP 1 729 238 A1 12/2006
JP 2004-213692 A 7/2004
(Continued)

OTHER PUBLICATIONS

Japanese Office Action dated Jan. 27, 2014, issued by the Japanese Patent Office in corresponding Japanese Patent Application No. 2012-030056, and English language translation of Office Action. (11 pages).
(Continued)

*Primary Examiner* — Tonia L Dollinger
*Assistant Examiner* — Mehulkumar J Shah
(74) *Attorney, Agent, or Firm* — Buchanan Ingersoll & Rooney PC

(57) ABSTRACT

An information processing system comprises an information processing device and a portable information terminal that allow communication therebetween. The portable information terminal includes: an application detection part for detecting a running application; a management part for detecting a cloud service to which the application connects and managing the application and the cloud service; a destination information generation part for generating destination information required for the information processing device to use the cloud service; and a transmission part for sending the destination information to the information processing device. The information processing device includes: a destination setting part for automatically configuring the destination to connect to the cloud service the same as that used by the running application on the portable information
(Continued)

terminal in accordance with the destination information; and a data processing part for connecting to the cloud service to send and receive data.

25 Claims, 9 Drawing Sheets

(52) U.S. Cl.
CPC ... *H04N 1/00244* (2013.01); *H04N 2201/001* (2013.01); *H04N 2201/006* (2013.01); *H04N 2201/0039* (2013.01); *H04N 2201/0046* (2013.01); *H04N 2201/0094* (2013.01)

(58) Field of Classification Search
CPC ....... H04L 43/0876; H04L 12/26; G06F 3/12; G06F 21/35; G06F 9/5072; G06F 9/50; B41J 29/38; H04N 1/00; H04N 1/00204; H04N 1/00244; H04N 2201/0094; H04N 2201/0046; H04N 2201/001; H04N 2201/006; H04N 2201/0039
USPC ........... 709/224; 340/16.1; 370/252; 714/39, 714/47.1–47.3
See application file for complete search history.

(56) References Cited

U.S. PATENT DOCUMENTS

| | | | |
|---|---|---|---|
| 2003/0123079 A1 | 7/2003 | Yamaguchi et al. | |
| 2006/0047725 A1* | 3/2006 | Bramson | G06F 21/604 |
| 2007/0249376 A1 | 10/2007 | Ogura et al. | |
| 2009/0033984 A1 | 2/2009 | Sahashi | |
| 2009/0091791 A1* | 4/2009 | Ferlitsch | G06F 3/1203 |
| | | | 358/1.15 |
| 2010/0125612 A1* | 5/2010 | Amradkar | H04L 63/105 |
| | | | 707/802 |
| 2010/0231950 A1 | 9/2010 | Sawayanagi et al. | |
| 2010/0318609 A1* | 12/2010 | Lahiri | G06F 9/455 |
| | | | 709/205 |
| 2011/0299110 A1* | 12/2011 | Jazayeri | G06F 3/1204 |
| | | | 358/1.15 |
| 2012/0033254 A1* | 2/2012 | Numata | G06F 3/1213 |
| | | | 358/1.15 |
| 2012/0042065 A1* | 2/2012 | Takahashi | G06F 3/1203 |
| | | | 709/224 |
| 2012/0260118 A1* | 10/2012 | Jiang | G06F 9/4843 |
| | | | 713/340 |
| 2012/0314244 A1* | 12/2012 | Kurihara | G06F 3/1204 |
| | | | 358/1.15 |
| 2013/0021647 A1* | 1/2013 | Ozaki | G06F 3/1204 |
| | | | 358/1.15 |
| 2013/0128306 A1* | 5/2013 | Takahashi | 358/1.15 |
| 2014/0313539 A1* | 10/2014 | Kawano | 358/1.14 |

FOREIGN PATENT DOCUMENTS

| | | | |
|---|---|---|---|
| JP | 2007-310865 A | 11/2007 | |
| JP | 2008-181215 A | 8/2008 | |
| JP | 2009-55580 A | 3/2009 | |
| JP | 2013-109616 A | 6/2013 | |

OTHER PUBLICATIONS

Extended European Search Report dated Jun. 20, 2013, by the European Patent Office in corresponding European Patent Application No. 13 153 636.9. (7 pages).

Communication pursuant to Article 94(3) EPC dated Mar. 23, 2017, by the European Patent Office in corresponding European Patent Application No. 13 153 636.9 (7 pages).

* cited by examiner

INFORMATION PROCESSING SYSTEM 1

FIG. 5

MANAGEMENT TABLE  TB1

| No. | CLOUD SERVICE | DESTINATION ADDRESS | ADDRESS FOR INFORMATION PROCESSING DEVICE | APPLICATION |
|---|---|---|---|---|
| 1 | DOCUMENT MANAGEMENT SERVICE | http://www.······/····· | http://www.······/····· | APPLICATION A |
| 2 | ABC SERVICE | http://www.······/····· | http://www.······/····· | APPLICATION B |
| 3 | NETWORK SERVICE | http://www.······/····· | — | APPLICATION C |
| 4 | | | | |
| 5 | | | | |
| 6 | | | | |

INFORMATION PROCESSING SYSTEM, PORTABLE INFORMATION TERMINAL, INFORMATION PROCESSING DEVICE, AND NON-TRANSITORY COMPUTER READABLE RECORDING MEDIUM

This application is based on the application No. 2012-030056 filed in Japan, the contents of which are hereby incorporated by reference.

BACKGROUND OF THE INVENTION

Field of the Invention

The present invention relates to an information processing system, a portable information terminal, an information processing device and a non-transitory computer readable recording medium. The present invention more specifically relates to a technique for the portable information terminal to remote-control the information processing device.

Description of the Background Art

Conventional information processing devices called as MFPs (Multi-Function Peripherals) including copy and/or scan function are used with network access and are allowed to send and receive a variety of data such as document data. By way of example, the information processing device may send image data generated with scan function to devices such as a server over a network.

In these days, portable information terminals such as tablet terminals or smart phones have become widely popular. This type of portable information terminal includes a function allowing a short distance wireless communication with a specific device with NFC (Near Field Communication) besides wireless network connection function to LAN (Local Area Network) or WAN (Wide Area Network), or public phone lines.

This type of conventional portable information terminals are caused to operate in cooperation with the information processing device. This known technique is introduced for example in Japanese Patent Application Laid-Open No. JP 2007-310865 A. According to this known technique, after an e-mail is written by a user on the portable information terminal the one he or she is used to write with, the portable information terminal forwards mail information as to the written unsent e-mail to the information processing device. As acquiring the mail information from the portable information terminal, the information processing device sends the e-mail after attaching image data generated with scan function to the e-mail. According to the known technique, after the e-mail is written on the portable information terminal the one he or she is used to write with, the information processing device acquires the mail information as to the e-mail and sends. Compared to a case where the user writes the e-mail by operating an operational panel of the information processing device the one he or she is not used to write with, the user's operation efficiency is improved.

Even with the known technique, the user is required to write the e-mail by him/herself on the portable information terminal. So, the user needs to, for example, enter a destination address of the e-mail or mail text by manual. Although the user may write the e-mail on the portable information terminal the one he or she is used to write with, long burden is still on the user. The user should operate by manual and which is still bothersome.

Cloud services that stores a variety of data such as document data over an internet have been provided in these days. Through the cloud services, anytime-anywhere data uploading or downloading is allowed under the environment where accessible to the internet, so the cloud services are convenient. In particular, with the popularization of the portable information terminals such as tablet terminals or smart phones in these days, many users use the cloud service through the portable information terminals. In near future, more users will use the portable information terminals to take therein the image data generated by the information processing device with scan function and to upload the image data to the cloud service, or to forward the image data downloaded from the cloud service to the information processing device and to cause the information processing device to produce a printed output based on the image data with print function.

It, however, is inefficient to take the data to upload to the cloud service or that downloaded from the cloud service once in the portable information terminal. This process does not provide any user-friendliness. It is necessary for the information processing device to directly upload the image data generated by itself with scan function to the cloud service or to directly download the image data stored on the cloud service and produce the printed output based on the image data.

The information processing devices installed at places such as offices are shared by multiple users. The conventional information processing devices do not store therein information regarding the cloud service normally used by each user or authentication information such as user ID or password for logging into a user's account to use the cloud service.

With the above-mentioned conventional information processing device, it is assumed that the user uploads the data directly from the information processing device to the cloud service. In such a case, the user has to enter information such as the destination address to connect to the cloud service on the information processing device and logs into the cloud service by entering the authentication information including user ID and password through the information processing device. The user is required to make such operation by manual every time he or she connects to the cloud service through the information processing device. So, this operation is bothersome for the user.

In order to improve the operability when connecting to the cloud service from the information processing device, the information such as that regarding the cloud service used by each user or the authentication information for each user to log into the cloud service, for example, may be registered in advance with the information processing device. More than one information processing devices, however, is installed at the conventional offices. It is also bothersome to register in advance all the information regarding the cloud service used by all the users with every information processing device. Each company provides different services over the network for the cloud service and each user selects the cloud service that satisfies his or her needs. In particular, some users may use more than one cloud services depending on the usage. In order to register the cloud service used by each user with the information processing device, the service needs to be registered for each user and sometimes more than one services needs to be registered for one user. The registration operation got extremely complex. Also, when the user changes the cloud service that he or she used to use, the information registered with the information processing device needs to be updated every time the user changes the cloud service. Again, the bothersome change operation needs to be made.

SUMMARY OF THE INVENTION

The present invention is intended to solve the above problems. Thus, the present invention is intended to provide an information processing system, a portable information terminal, an information processing device and a non-transitory computer readable recording medium capable of realizing enhanced operability when connecting the information processing device to a cloud service which is used by a user and causing the information processing device and the cloud service to send and receive data directly from each other without any bothersome manual operation.

First, the present invention is directed to an information processing system comprising an information processing device and a portable information terminal that allow communication therebetween. Each of the information processing device and the portable information terminal uses a cloud service over a network.

According to an aspect of the information processing system, the portable information terminal includes: an application detection part for detecting a running application; a management part for detecting the cloud service to which the application connects and managing the application and the cloud service associated with each other; a destination information generation part for generating destination information required for the information processing device to use the cloud service based on the information managed by the management part; and a transmission part for sending the destination information to the information processing device while the communication with the information processing device is available. The information processing device includes: a destination setting part for automatically configuring the destination to connect to the cloud service the same as that used by the running application on the portable information terminal in accordance with the destination information received from the portable information terminal while the communication with the portable information terminal is available; and a data processing part for connecting to the cloud service to send and receive data based on the destination configured by the destination setting part.

Second, the present invention is directed to a portable information terminal capable of establishing communication with an information processing device from which data is sent and received. The portable information terminal is allowed to use a cloud service over a network by running an application.

According to one aspect of the portable information terminal, the portable information terminal, comprises: an application detection part for detecting a running application; a management part for detecting the cloud service to which the application connects and managing the application and the cloud service associated with each other; a destination information generation part for generating destination information required for the information processing device to use the cloud service based on the information managed by the management part; and a transmission part for sending the destination information to the information processing device while the communication with the information processing device is available, thereby causing the information processing device to automatically configure the destination to connect to the cloud service the same as that used by the running application.

Third, the present invention is directed to an information processing device capable of establishing communication with a portable information terminal. The information processing device is connected to a network, thereby accessing a cloud service over the network to upload or download data.

According to one aspect of the information processing device, the information processing device, comprises: a receipt part for receiving information from the portable information terminal while the communication with the portable information terminal is available; a destination setting part for automatically configuring a destination to connect over the network in accordance with destination information when the information received by the receipt part contains the destination information required to connect to the cloud service the same as that used by a running application on the portable information terminal; and a data processing part for connecting to the cloud service the same as that used by the running application on the portable information terminal in accordance with the destination information configured by the destination setting part to send and receive data from the cloud service.

Forth, the present invention is directed to a non-transitory computer readable recording medium on which a program is recorded. The program is executable on a portable information terminal capable of connecting to a cloud service over a network by running an application with an operating system. The program causes the portable information terminal to establish communication with an information processing device from which data is sent and received, thereby controlling the information processing device.

According to an aspect of the non-transitory computer readable recording medium, the program executed on the portable information terminal to function as a system comprises: an application detection part for detecting the application being run by the operating system; a management part for detecting the cloud service to which the application connects and managing the application and the cloud service associated with each other; a destination information generation part for generating destination information required for the information processing device to use the cloud service based on the information managed by the management part; and a transmission part for sending the destination information to the information processing device while the communication with the information processing device is available, thereby causing the information processing device to automatically configure the destination to connect to the cloud service the same as that used by the application being run by the operating system.

BRIEF DESCRIPTION OF THE DRAWINGS

FIG. 5 is an example of a management table managed by the management part;

DESCRIPTION OF THE PRESENT PREFERRED EMBODIMENTS

Figure 1:
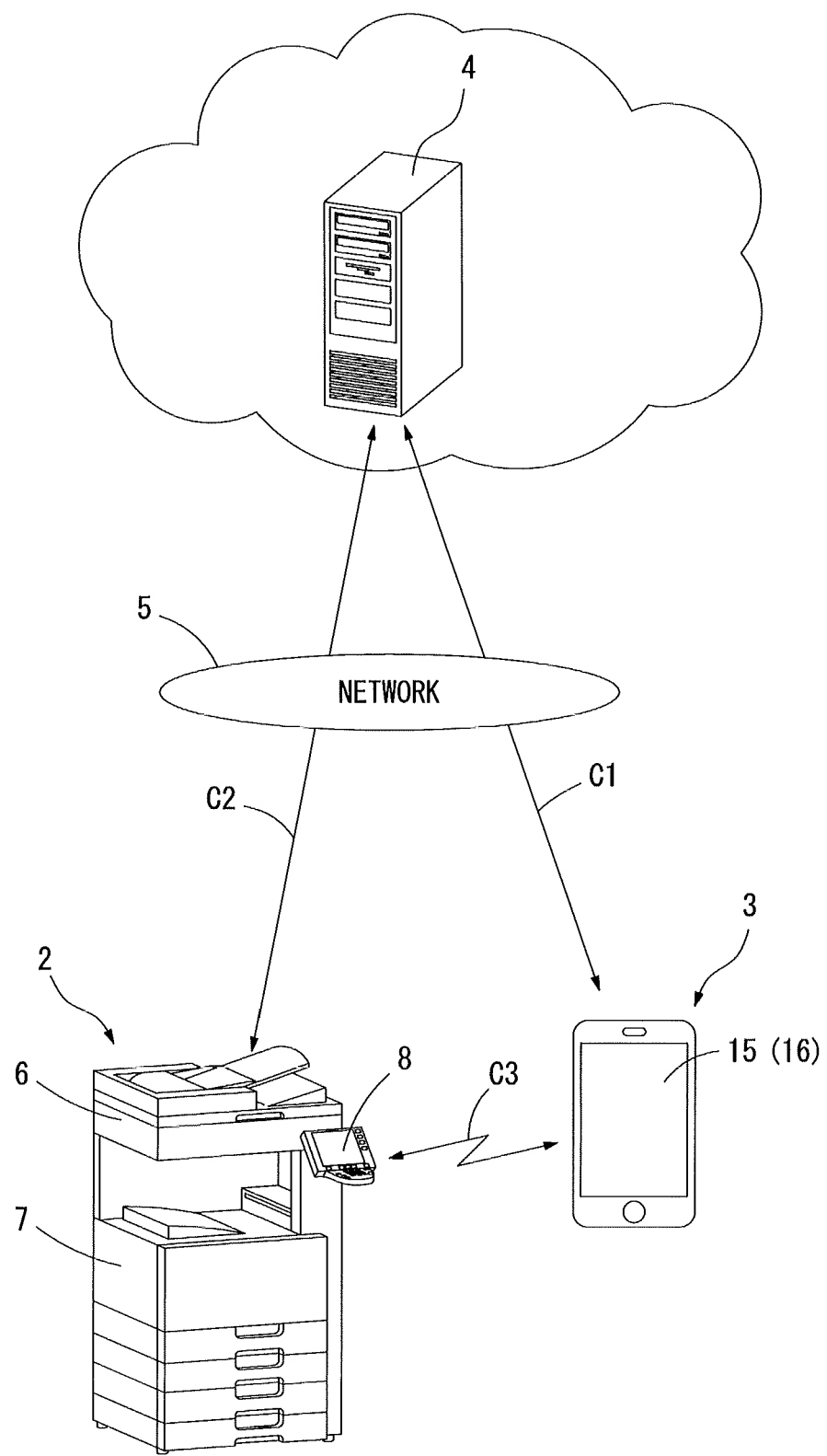
FIG. 1 shows an exemplary configuration of an information processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1 of the present preferred embodiment. The information processing system 1 comprises an information processing device 2 formed from a device such as one of MFPs and a portable information terminal 3 used by a user by usually carrying it with him or her. On the information processing system 1, each of the information processing device 2 and the portable information terminal 3 is capable of accessing a service providing server 4 that provides a cloud service over a network 5. The network 5 includes LAN and/or WAN or public phone lines and/or internet networks.

The information processing device 2 having multiple functions including scan, print and box function, for example, besides function to establish data communication over the network 5. Scan function is to drive a scanner section 6 provided at the upper part of the device body of the information processing device 2 to read image of a document and generate image data. Print function is to drive a printer section 7 provided at the central part of the device body of the information processing device 2 to produce a printed output. Box function is to store a variety of data in a storage region (BOX) described later. The image data generated with scan function or data received over the network 5, for example, is stored in the storage region. These scan, print and box functions may operate in relative to data communication function to establish data communication over the network 5. For scan function, for instance, the image data generated by reading the document may be sent to outside with data communication function. For print function, the printed output may be produced based on the image data acquired from outside with data communication function. This type of information processing device 2 placed at a place such as an office is used by multiple users.

An operational panel 8, a user interface operable by a user in use of the information processing device 2 is provided at the front part of the device body of the information processing device 2. The information processing device 2 puts at least one of the above-mentioned multiple functions into operation to execute a job specified by the user in response to user's instruction given through the operational panel 8, for example.

The information processing device 2 includes a function to establish a short distance wireless communication with a specific device placed within a range of a predetermined distance with NFC (Near Field Communication). The information processing device 2 including short distance wireless communication function is capable of establishing communication with the portable information terminal 3 carried by the user who is trying to use the information processing device 2.

The portable information terminal 3 is a portable information terminal device formed from a device such as a tablet terminal or a smart phone. The portable information terminal 3 is owned by an individual user. The portable information terminal 3 includes two types of wireless communication functions. One is to establish data communication with other devices over the network 5 and another is to establish short distance wireless communication with the specific device placed in the range of the predetermined distance with NFC. A various types of application programs are allowed to be installed on the portable information terminal 3. The application program to use a cloud service provided by the service providing server 4 may be installed in advance on the portable information terminal 3. In such a case, the user may use the cloud service provided by the service providing server 4 anytime and anywhere he or she wants through the portable information terminal 3 by running the installed application.

The service providing server 4 is installed on the internet, for example, and provides a variety of cloud services over the internet. The service providing server 4 creates an account for each registered user, for example, and sets a predetermined dedicated data storage region for each account available for each registered user. The service providing server 4 provides the service for the registered user to upload data to the data storage region over the network 5 or to download data in the data storage region. This type of service providing server 4 is generally installed on the internet and the number of which is not just one. The example of FIG. 1 shows only one of the service providing servers 4 generally installed on the internet.

On the information processing system 1 configured as described above, the user normally uses his or her portable information terminal 3 to establish connection C1 with the cloud service provided by the service providing server 4 and use the cloud service. The user sometimes would like to upload the image data generated by reading the document on the information processing device 2 directly to the cloud service from the information processing device 2 or to download the data stored on the cloud service directly to the information processing device 2 and produce the printed output based on the downloaded data. In such a case, the information processing system 1 of the present preferred embodiment causes the portable information terminal 3 and the information processing device 2 to establish short distance wireless communication C3 therebetween. In repose to the establishment of short distance wireless communication C3, the portable information terminal 3 controls the information processing device 2 and automatically configures with the information processing device 2 a destination to connect to the cloud service used by the user. Connection C2 between the information processing device 2 and the cloud service may be established without any information such as the destination to connect entered to the information processing device 2 by the user. The information processing device 2 is then allowed to send and receive data from the cloud service directly. The portable information terminal 3 and the information processing device 2 are described in detail next.

Figure 2:
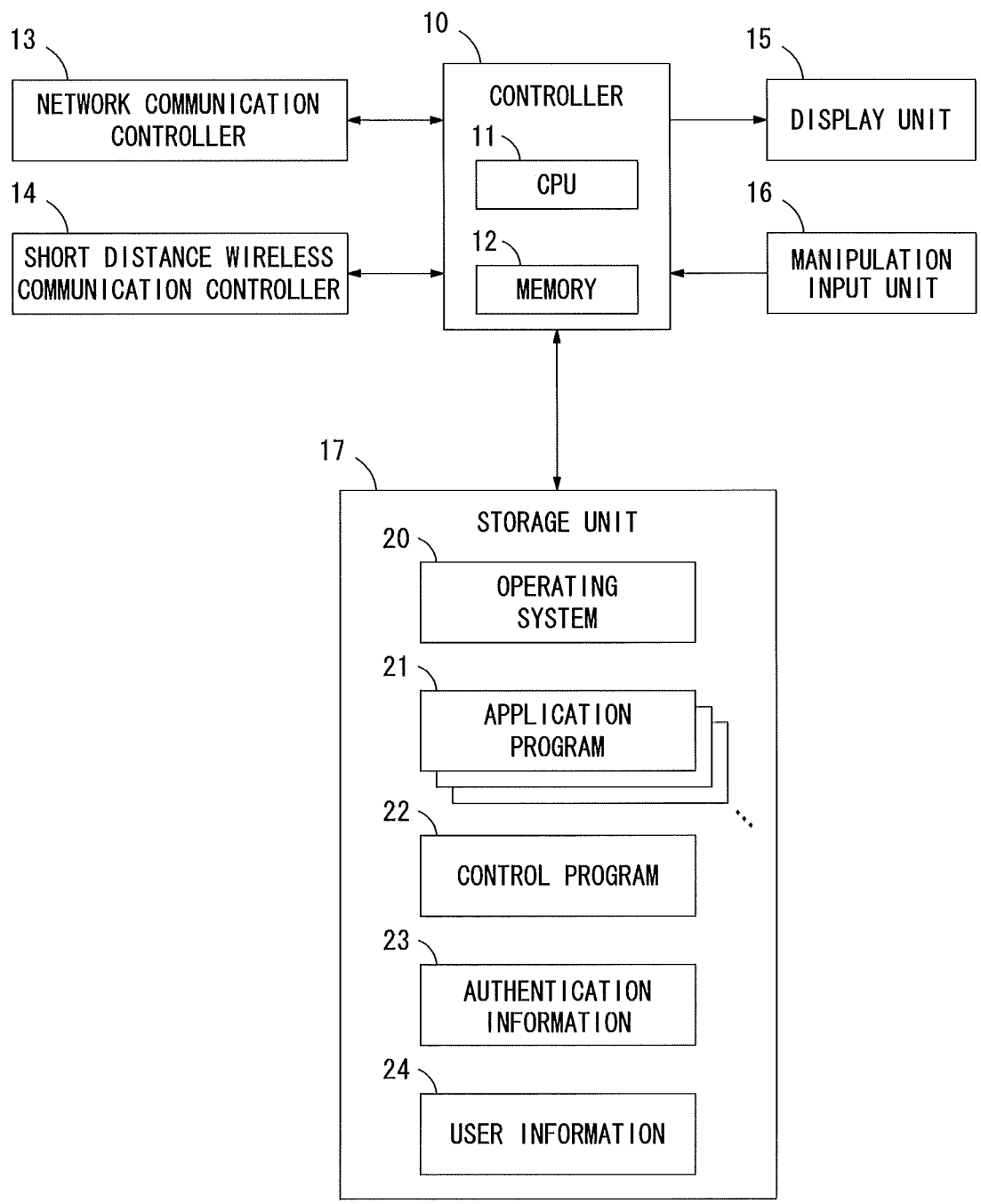
FIG. 2 is a block diagram showing an exemplary hardware configuration of a portable information terminal.

The portable information terminal 3 is described next. FIG. 2 is a block diagram showing an exemplary hardware configuration of the portable information terminal 3. As illustrated in FIG. 2, the portable information terminal 3 includes a controller 10, a network communication controller 13, a short distance wireless communication controller 14, a display unit 15, a manipulation input unit 16 and a storage unit 17. The portable information terminal 3 formed from the device such as the smart phone includes a microphone or a speaker besides the above-mentioned units to make a voice call.

The controller 10 including a CPU 11 and a memory 12 controls operations of each processing part. The CPU 11 executes a various types of programs stored on the storage unit 17. The memory 12 stores therein data such as temporary data required in accordance with execution of each program by the CPU 11.

The network communication controller 13 controls data communication when the communication is established over the network 5 by the controller 10. The short distance wireless communication controller 14 controls short distance wireless communication when the communication is established with the information processing device 2 by the controller 10. Once the short distance wireless communication becomes available with the information processing device 2, the short distance wireless communication controller 14 automatically detects it and notifies the controller 10.

The display unit 15 on which various types of information is displayed to the user of the portable information terminal 3 is formed from a device such as a color liquid crystal display, for example. The manipulation input unit 16 formed with parts such as touch panel sensors arranged on the screen of the display unit 15, for example, receives entries by the user of the portable information terminal 3.

The storage unit 17 is formed from a nonvolatile storage device such as a solid state drive (SSD). The storage unit 17 stores therein as a program executed by the CPU 11 an operating system 20 which is a basic program of the portable information terminal 3, a plurality of application programs 21 used by the user and a control program 22 which makes the controller 10 function as a monitoring controller 40 described later.

The plurality of application programs 21 include a program for the portable information terminal 3 to connect to the service providing server 4 and use the cloud service. When, for example, more than one cloud services is used by the user, the plurality of application programs 21 corresponding to each of the more than one cloud services are stored in the storage unit 17.

The storage unit 17 stores therein authentication information 23 and user information 24 besides programs. The authentication information 23 is used when the portable information terminal 3 accesses the service providing server 4 to log into the user-specific account. The authentication information 23 is about user ID or password registered with the service providing server 4. For the user using more than one cloud services, the authentication information 23 is stored for each cloud service. The user information 24 is information to use the information processing device 2, and is about the user of the portable information terminal 3. The portable information terminal 3 sends the user information 24 to the information processing device 2, thereby making the information processing device 2 perform user authentication.

As the above-described portable information terminal 3 is powered on, the CPU 11 automatically reads and executes the operating system 20 and then reads and executes the control program 22, The CPU 11 then reads and executes the application program 21 corresponds to the application specified by the user in response to an application start up instruction by the user.

Figure 3:
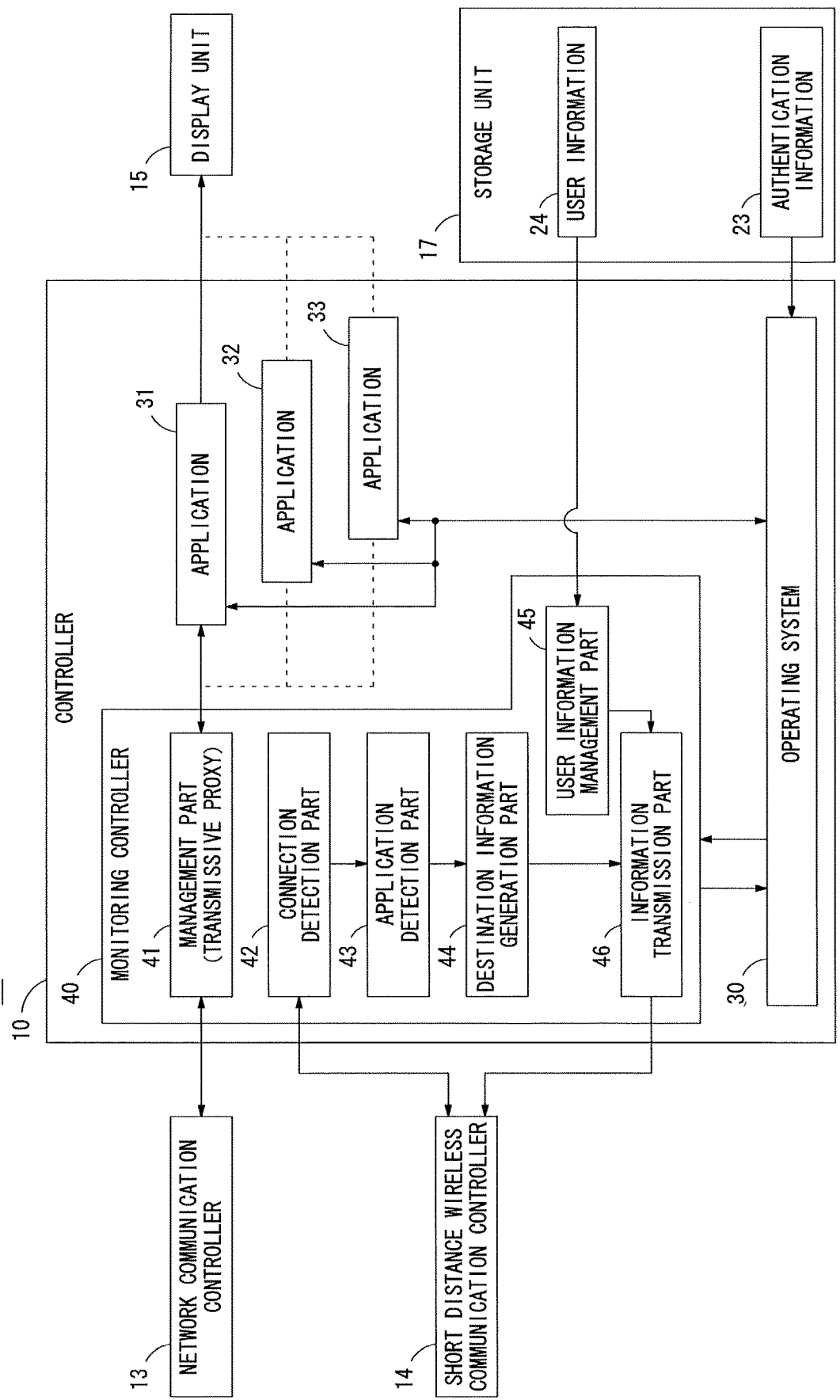
FIG. 3 is a block diagram showing an exemplary functional configuration of a controller on the portable information terminal.

FIG. 3 is a block diagram showing an exemplary functional configuration of the controller 10 realized while each of the programs is being run by the CPU 11 as described above. As shown in FIG. 3, in response to the execution of the operating system 20, the control program 22 and the plurality of application programs 21 by the CPU 11, the controller 10 puts an operating system 30, the monitoring controller 40 and a plurality of applications 31, 32 and 33 into operation to function. The operating system 30 is run in response to execution of the operating system 20 by the CPU 11 to control basic overall operations of the portable information terminal 3. The monitoring controller 40 is run in response to execution of the control program 22 by the CPU 11. The monitoring controller 40 resides in the controller 10 while the operating system 30 is running. Each of the applications 31, 32 and 33 extends a specific application function to the portable information terminal 3. The plurality of applications 31, 32 and 33 are applications for the portable information terminal 3 to connect to the respective cloud services over the network 5, for instance, and make the cloud services available.

The operating system 30 not only starts up and terminates each of the applications 31, 32 and 33 in response to the user's instruction but also manages the running application. The operating system 30 also manages the authentication information 23 required for log-in to the user-specific account after each of the applications 31, 32 and 33 connects to the cloud service.

The operating system 30 may run the plurality of applications 31, 32 and 33 at a time as shown in FIG. 3. In such a case, the operating system 30 sets one of the plurality of applications as a foreground application and others as background applications in accordance with the user's instruction. In the example of FIG. 3, the application 31 is configured to run in the foreground. The application 31 in the foreground reads the authentication information 23 required to connect to a specific cloud service from the operating system 30 and logs into a user's account with the authentication information 23. The application 31 causes display screen image to use the cloud service to be displayed on the display unit 15 based on information acquired from the cloud service. More specifically, on the portable information terminal 3, only the foreground application 31 is allowed to cause the display screen image to be displayed on the display unit 15. While the application 31 is running in the foreground, the background applications 32 and 33 read the authentication information 23 from the operating system 30 and connect to the respective cloud services in the background.

When the applications 31, 32 and 33 running on the controller 10 connect to the respective cloud services via the network communication controller 13, the monitoring controller 40 residing in the controller 10 detects the connection. The monitoring controller 40 manages each of the applications 31, 32 and 33 and the respective cloud services to which each application 31, 32 and 33 connects after associating them with each other.

As the short distance wireless communication with the information processing device 2 becomes available for the short distance wireless communication controller 14, the monitoring controller 40 detects it. At the time of the detection, the monitoring controller 40 detects the application 31 set as the foreground application and detects the cloud service to which the application 31 connects. The monitoring controller 40 generates destination information for the information processing device 2 to directly connect to the crow service to which the foreground application 31 connects and sends the generated destination information to the information processing device 2, thereby causing the information processing device 2 to automatically configure the destination to connect to the cloud service.

As shown in FIG. 3, the monitoring controller 40 includes a management part 41, a connection detection part 42, an application detection part 43, a destination information generation part 44, a user information management part 45 and an information transmission part 46.

The management part 41 serves as a transmissive proxy when each application 31, 32 and 33 establishes network communication via the network communication controller 13. Each application 31, 32 and 33 sends and receives data via the management part 41 in network communication. As detecting that each application 31, 32 and 33 is trying to establish network communication, the management part 41 extracts a destination address such as URL (Uniform Resource Locator), for example, and determines whether or not the destination is the cloud service. Some of the applications run on the portable information terminal 3 do not use the cloud service. The management part 41, therefore, determines whether or not the destination connected by each application 31, 32 and 33 is the cloud service. If the destination is the cloud service as a result of the determination, the management part 41 associates the application and the cloud service with each other one-by-one and manages.

Figure 4:
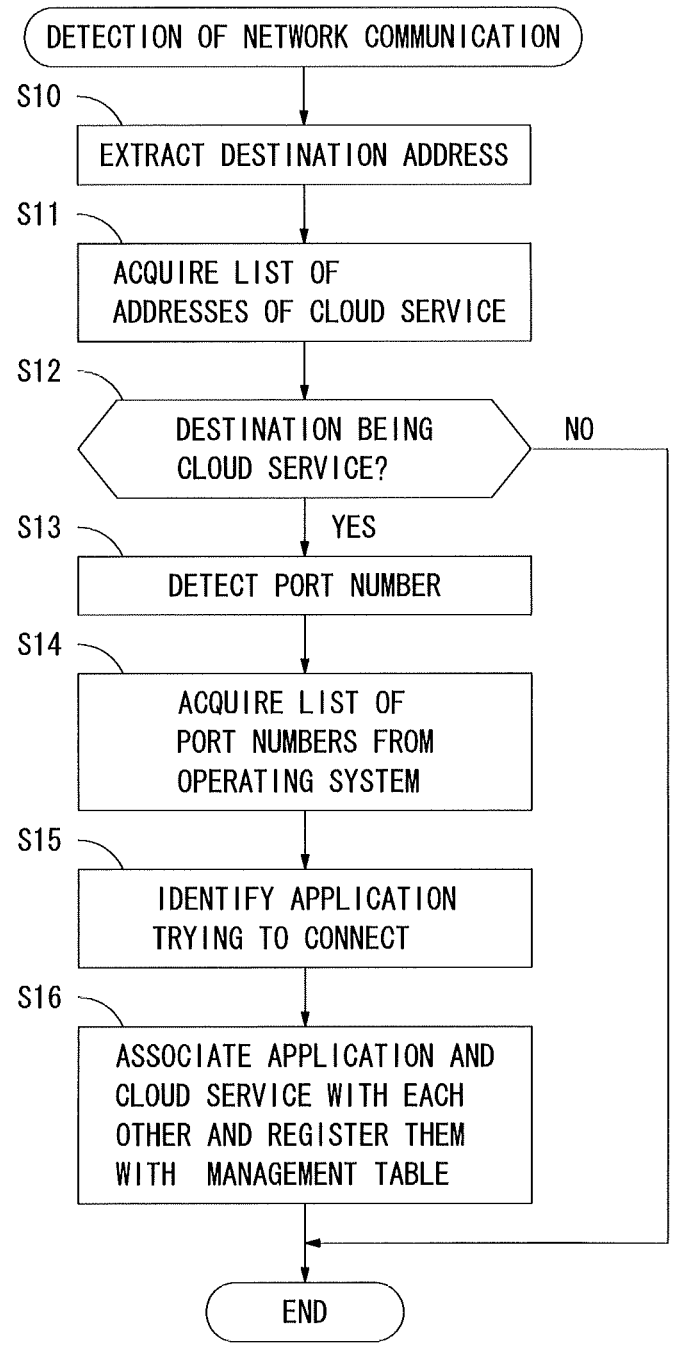
FIG. 4 is a flow diagram explaining an exemplary sequential procedure of the process performed by a management part residing in the portable information terminal.

FIG. 4 is a flow diagram explaining an exemplary sequential procedure of the process performed by the management part 41. This process is performed in response to detection by the management part 41 of the information sent from each application 31, 32 and 33 over the network 5. When detecting that the network communication is established by the foreground application 31, for example, the management part 41 starts this process to extract the destination address in the information output from the application 31 (step S10). The management part 41 then reads a management table TB1 managed in the memory 12 or the storage unit 17 and acquires a list of addresses of the cloud service in the management table TB1 (step S11).

FIG. 5 is an example of the management table TB1 managed by the management part 41. More than one cloud services used by the user, for example, is registered in the management table TB1. For each cloud service, a cloud service name D1, a destination address D2 to connect to the cloud service by the portable information terminal 3, an address for information processing device D3 to connect to the cloud service by the information processing device 2 and an application D4 using the cloud service are registered in the management table TB1 which is table information. This management table TB1 is created at installation of the control program 22, for example. Information relating to the cloud service used by the user (the cloud service name D1, the destination address D2 and the address for information processing device D3) is then registered in advance by the user with the created management table TB1. An address to access a top page of web pages for use in the cloud service, for example, is registered as the destination address D2. An address to directly access the user-specific account of the web pages for use in the cloud service, for example, is registered as the address for information processing device D3. If the cloud service does not accept the direct access to the user specific-account, the address for information processing device D3 is not necessarily registered.

Referring back to FIG. 4, the management part 41 acquires the list of the destination address D2 of the above-described management table TB1 and determines whether or not the destination connected by the application 31 is the cloud service (step S12). It is determined that the destination address extracted from the information output from the application 31 is registered in the list of the destination address D2. If the destination connected by the application 31 is not the cloud service as the result of the determination (when a result of step S12 is NO), the process performed by the management part 41 is complete.

If the destination connected by the application 31 is the cloud service (when a result of step S12 is YES), the management part 41 detects a port number which is used in network communication by the application 31 based on the information output from the application 31 (step S13). The operating system 30 assigns a unique port number to each of the applications 31, 32 and 33 individually. The management part 41 acquires a list of the port numbers used by each application 31, 32 and 33 from the operating system 30 (step S14) and identifies the application 31 which is trying to connect to the cloud service based on the port number detected in step S13 (step S15). The management part 41 then registers the identified application 31 as the application D4 of the management table TB1, thereby associating the application 31 and the cloud service with each other one-by-one in the management table TB1 and registering it (step S16).

The management part 41 performs the above-described process every time that each application 31, 32 and 33 is started up and the network communication is started. The cloud service may not be used by a specialized application. The cloud service may be used by the application that is widely used such as a browser. Even in such a case, the widely used application and the cloud service to which the widely used application currently connects are allowed to be associated with each other and registered in the management table TB1.

The connection detection part 42 detects establishment of the connection with the information processing device 2 allowing the short distance wireless communication therebetween via the short distance wireless communication controller 14. As described above, once the short distance wireless communication becomes available with the information processing device 2, the short distance wireless communication controller 14 automatically detects the available status and notifies the controller 10. The connection detection part 42 detects the connection with the information processing device 2 allowing the short distance wireless communication therebetween by receiving the notification of the connection status. In response to the detection of the connection with the information processing device 2 by the connection detection part 42, the application detection part 43, the destination information generation part 44 and the information transmission part 46 are put into operation to function in series in the monitoring controller 40. The user information management part 45 manages the user information 24 required to use the information processing device 2 in the storage unit 17, for example.

The application detection part 43 detects the application running on the controller 10. As the connection with the information processing device 2 is detected by the connection detection part 42, the application detection part 43 makes an inquiry to the operating system 30 what application is currently running. In response to the inquiry from the application detection part 43, the operating system 30 notifies the application detection part 43 of the current running application. In the example of FIG. 3, the plurality of applications 31, 32 and 33 are running. In this case, the operating system 30 notifies the application detection part 43 that at least the application running in the foreground is the application 31. The application detection part 43 then detects the application 31 running in the foreground on the controller 10.

In response to the detection by the application detection part 43 of the application 31 running in the foreground, the destination information generation part 44 reads the management table TB1 managed by the management part 41. With reference to the read management table TB1, the destination information generation part 44 detects the cloud service used by the application 31 running in the foreground.

As described above, the management part 41 updates the management table TB1 every time the application to use the cloud service is started up by the user. The information of the application and the cloud service associated with each other in the management table TB1 is, therefore, always updated. It is assumed, for example, that the widely used application such as the browser is started up by the user to use the cloud service. Even in this case, the destination information generation part 44 is allowed to detect the cloud service used by the widely used application by referring to the management table TB1.

The destination information generation part 44 generates the destination information to connect to the detected cloud service by the information processing device 2. This destination information is an address such as URL to use the cloud service by directly connecting to the service providing server 4 over the network 5 from the information processing device 2. When the address for the information processing device D3 for the detected cloud service is registered in the management table TB1, the destination information generation part 44 reads the address for the information processing device D3 and generates the destination information. If no address is registered as the address for the information processing device D3 for the detected cloud service, the destination information generation part 44 reads the destination address D2 for the detected cloud service and generates the destination information.

The information transmission part 46 sends the information to the information processing device 2 via the short distance wireless communication controller 14. After the destination information is generated by the destination information generation part 44, the information transmission part 46 acquires the generated destination information. The information transmission part 46 also acquires from the operating system 30 the authentication information 23 required to use the cloud service detected by the destination information generation part 44, that is, the cloud service to which the application 31 currently running in the foreground connects. The information transmission part 46 further acquires the user information 24 managed by the user information management part 45.

The information transmission part 46 outputs the destination information, the authentication information 23 and the user information 24 to the short distance wireless communication controller 14, thereby sending the information to the information processing device 2. The information transmission part 46 sends the destination information to the information processing device 2, so that the information processing device 2 is allowed to automatically configure in advance the destination for network communication based on the received destination information. The information processing device 2 is allowed to log into the user-specific account of the cloud service with the authentication information 23 sent to the information processing device 2 from the information transmission part 46 when connecting to the cloud service. The information transmission part 46 sends the user information 24, so that the information processing device 2 is allowed to perform user authentication based on the user information 24.

Figure 6:
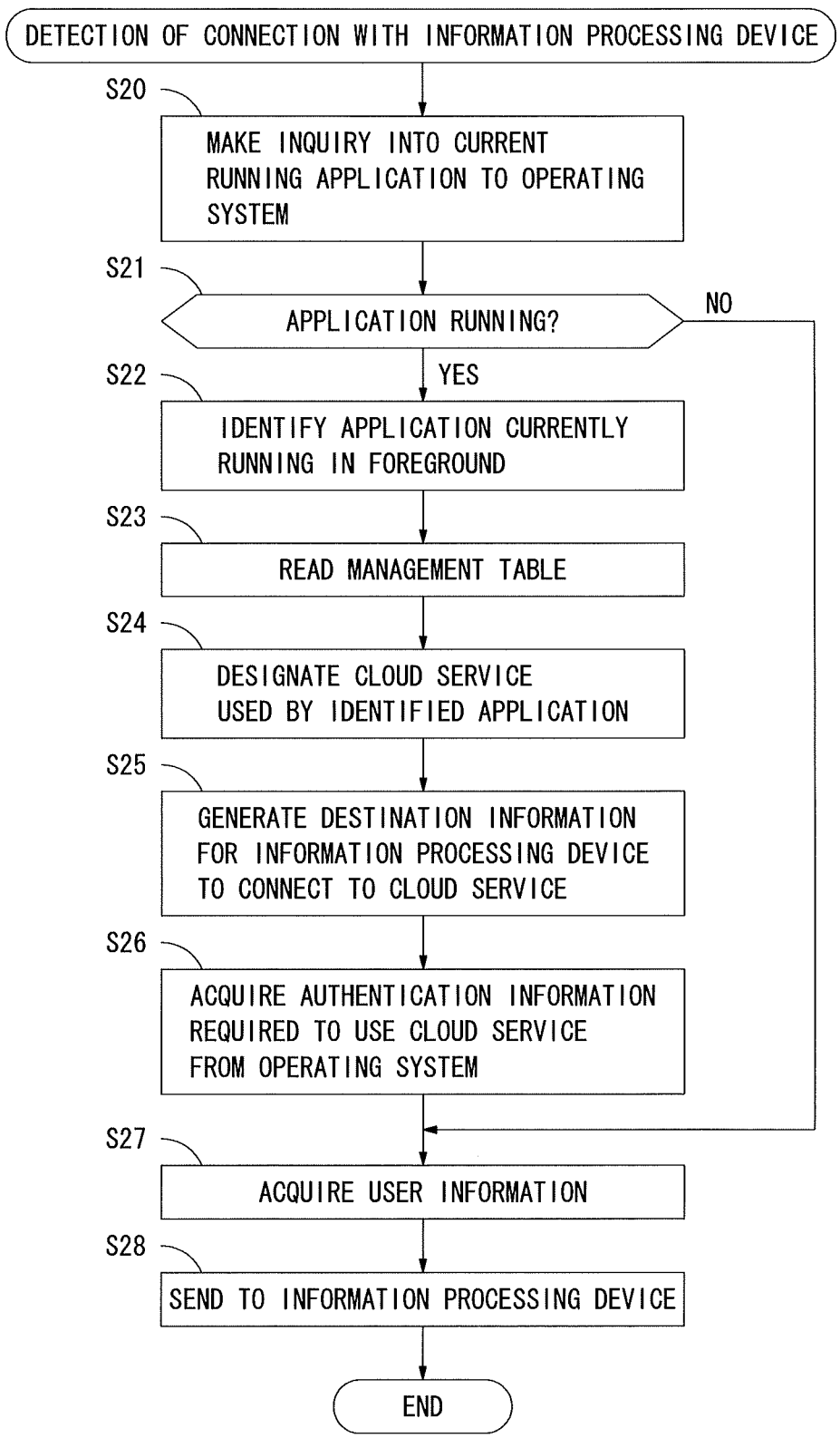
FIG. 6 is a flow diagram explaining an exemplary sequential procedure of the process performed when the portable information terminal establishes communication with an information processing device.

FIG. 6 is a flow diagram explaining an exemplary sequential procedure of the process performed by the above-described connection detection part 42, the application detection part 43, the destination information generation part 44 and the information transmission part 46. This process is started on the monitoring controller 40 upon the detection of the connection with the information processing device 2 by the connection detection part 42. As the connection with the information processing device 2 is detected, the monitoring controller 40 makes an inquiry into the current running application to the operating system 30 (step S20). If any application is running (when a result of step S21 is YES), the monitoring controller 40 identifies the application 31 currently running in the foreground based on the notification from the operating system 30 (step S22). The monitoring controller 40 reads the management table TB1 (step S23) and detects the cloud service used by the application 31 currently running in the foreground (step S24). The destination information for the information processing device 2 to connect to the cloud service the same as that used by the application 31 running in the foreground is then generated (step S25). The monitoring controller 40 acquires the authentication information 23 corresponds to the cloud service used by the application 31 from the operating system 30 (step S26) and then acquires the user information 24 managed by the information management part 45 (step S27). The monitoring controller 40 sends the acquired information to the information processing device 2 via the short distance wireless communication controller 14 (step S28). As a result, the monitoring controller 40 is allowed to make the information processing device 2 perform user authentication and automatically configure the destination to connect to the cloud service in response to the authentication resulted in success without any operation made by the user. Also, the authentication information 23 necessary for the information processing device 2 to log-in to the cloud service may be sent in advance to the information processing device 2.

When no application is running as a result of the inquiry into the current running application to the operating system 30 (when a result of step S21 is NO), the monitoring controller 40 acquires only the user information 24 (step S27) and sends the acquired user information 24 to the information processing device 2 (step S28). In this case, the information processing device 2 performs only user authentication.

Figure 7:
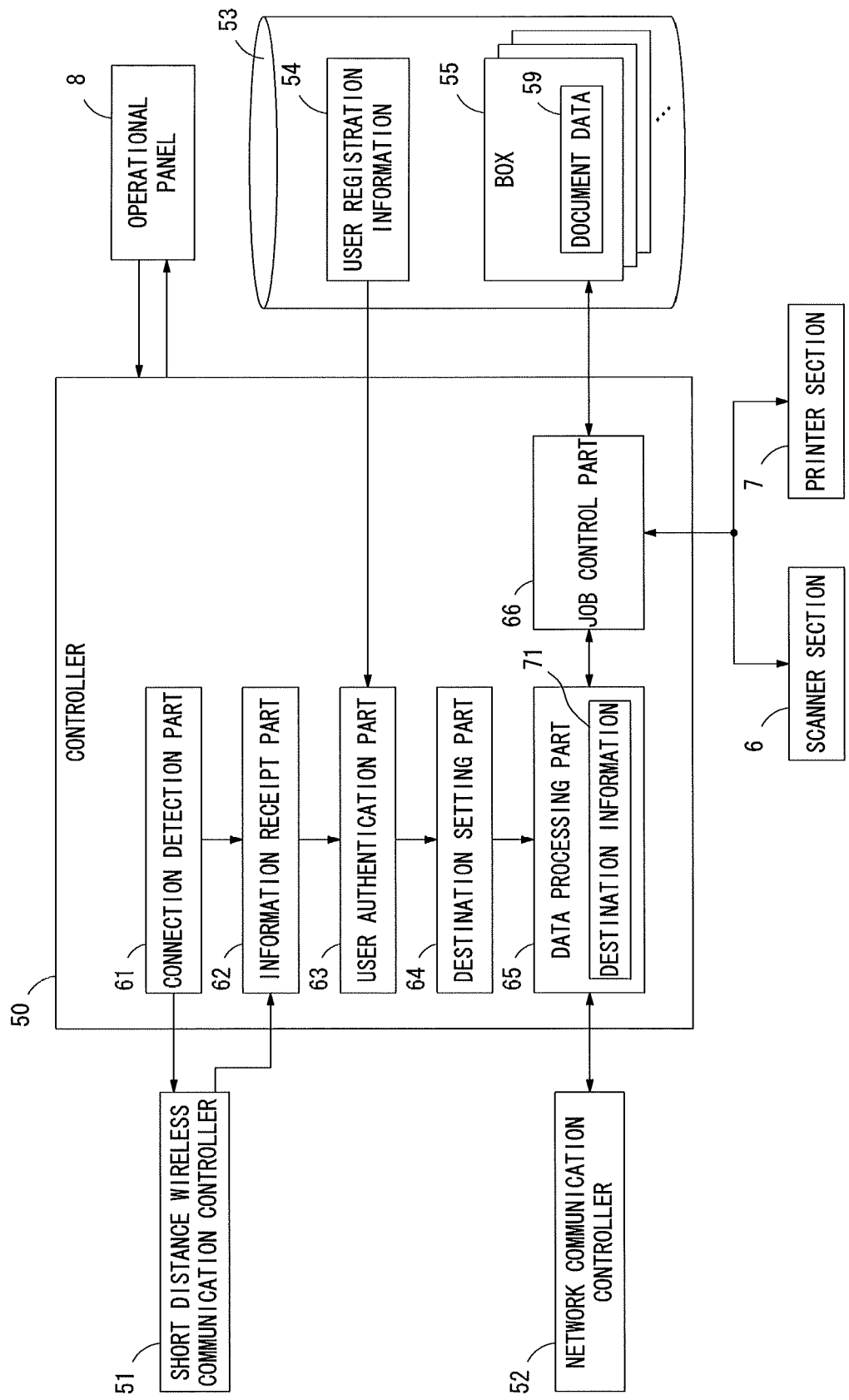
FIG. 7 is a block diagram showing an exemplary hardware configuration of the information processing device.

The information processing device 2 is described next. FIG. 7 is a block diagram showing an exemplary hardware configuration of the information processing device 2. As illustrated in FIG. 7, the information processing device 2 includes a controller 50, a short distance wireless communication controller 51, a network communication controller 52 and a storage device 53 besides the above-described scanner section 6, the printer section 7 and the operational panel 8.

The controller 50 includes a CPU and a memory which are not shown in figures, which is the same as that of the portable information terminal 3. In response to execution of a predetermined program by the CPU, the controller 50 serves as a connection detection part 61, an information receipt part 62, a user authentication part 63, a destination setting part 64, a data processing part 65 and a job control part 66.

The short distance wireless communication controller 51 controls short distance wireless communication when the communication with the portable information terminal 3 is established by the controller 50. Once the short distance wireless communication becomes available with the portable information terminal 3, the short distance wireless communication controller 51 automatically detects the connection status and notifies the controller 50. The network communication controller 52 controls data communication when the communication is established over the network 5 by the controller 50. When connecting to the cloud service over the network 5, the information processing device 2 sends and receives data via the network communication controller 52.

The storage device 53 is formed from a nonvolatile storage device such as a hard disk drive (HDD). The storage device 53 stores therein user registration information 54, for example. Information regarding the user authorized in advance to use the information processing device 2, for example, is registered as the user registration information 54. More specifically, the information that may identify the user, such as user ID and password is registered as the user registration information 54. This user registration information 54 is not necessarily stored in the storage device 53, and it may be stored in another device such as another server. The storage device 53 includes at least one BOX 55 as a storage region to store therein data such as document data 59. The BOX 55 is the storage region to store therein a variety of data when the user selects box function.

Each processing part put into operation to function on the controller 50 is described next. The connection detection part 61 resides in the controller 50 while the information processing device 2 is being powered on. The connection detection part 61 detects establishment of the connection with the portable information terminal 3 allowing the short distance wireless communication therebetween via the short distance wireless communication controller 51. In response to detection of the establishment of the connection with the portable information terminal 3 by the connection detection part 61, the information receipt part 62, the user authentication part 63 and the destination setting part 64 are put into operation to function in series.

The information receipt part 62 receives the variety of information sent from the portable information terminal 3 through the short distance wireless communication. As described above, the portable information terminal 3 sends the destination information, the authentication information 23 and the user information 24 to the information processing device 2 once the short distance wireless communication becomes available with the information processing device 2. The information receipt part 62 receives the information and sorts the information to separate the destination information, the authentication information 23 and the user information 24.

The user authentication part 63 acquires only the user information 24 which is separated by the information receipt part 62 and performs user authentication of the user using the portable information terminal 3. To be more specific, the user authentication part 63 reads the user registration information 54 in the storage device 53 and determines whether or not any information registered as the user registration information 54 matches the user information 24, thereby performing user authentication. If the user authentication results in success, the user authentication part 63 puts the information processing device 2 into a logged-in state in which the user using the portable information terminal 3 is logging in. As a result, the user using the portable information terminal 3 is allowed to make the information processing device 2 execute a variety of jobs. The user authentication part 63 then puts the destination setting part 64 into operation to function when the user authentication results in success.

The destination setting part 64 acquires the destination information and the authentication information 23 separated by the information receipt part 62. The destination setting part 64 outputs the information to the data processing part 65, thereby configuring in advance with the data processing part 65 the destination to connect to the cloud service the same as that connected by the application 31 running in the foreground on the portable information terminal 3.

The data processing part 65 establishes network communication via the network communication controller 52. The data processing part 65 sends and receives data from an external device over the network 5. After the information processing device 2 is put into the logged-in state, the data processing part 65 configures in advance the destination to connect over the network 5 based on destination information 71 received from the destination setting part 64. The data processing part 65 rewrites the default value as to the destination for the network communication configured in advance, for example, to the destination information 71 received from the destination setting part 64. Also, the data processing part 65 saves the authentication information 23 received from the destination setting part 64. The data processing part 65 is configured to send the saved authentication information 23 to the destination on the access to the destination based on the destination information 71. The data processing part 65 is allowed to automatically connect to the cloud service the same as that connected by the application 31 running in the foreground on the portable information terminal 3 and automatically log-in to the user's account at the start of the network communication.

The job control part 66 is put into operation to function after the information processing device 2 is put into the logged-in state. The job control part 66 controls execution of a job specified by the user in response to the user's instruction given through the operational panel 8, for example. The job control part 66 drives the scanner section 6 to read the document to generate the image data or the printer section 7 to produce the printed output by outputting the image data to the printer section 7. The job control part 66 stores the document data 59 in the BOX 55 or read the document data 59 in the BOX 55. The job control part 66 outputs the data such as the image data to the data processing part 65, thereby sending the data to the external device over the network 5, or gives the instruction to acquire the data such as the image data to the data processing part 65 to acquire the data from the external device over the network 5.

It is assumed that, for example, the instruction to send the image data generated by reading the document with the scan function to outside over the network 5 is given by the user through the operational panel 8 after the information processing device 2 is put into the logged-in state. In this case, the job control part 66 drives the scanner section 6 to acquire the image data. The job control part 66 then outputs the image data acquired from the scanner section 6 to the data processing part 65. The data processing part 65 starts establishing network communication in response to input of the image data from the job control part 66. The data processing part 65 connects to the destination in accordance with the destination information 71 which is updated in advance and sends the authentication information 23 saved in advance to the destination, thereby automatically logging into the cloud service to be used by the user. The data processing part 65 then sends the image data acquired from the job control part 66 to the cloud service and uploads it.

The user, therefore, is not required to enter the destination information 71 or the authentication information 23 for the information processing device 2 to connect to the cloud service by manual. The user is allowed to upload the data to the cloud service normally used by the user easily by just giving the instruction to send the image data read with the scan function to the outside. It is similar for uploading the data in the BOX 55 to the cloud service.

It is similar for downloading the data from the cloud service not only for uploading the data to the cloud service. The instruction to acquire the image data from the outside and produce the printed output may be given by the user through the operational panel 8 after the information processing device 2 is put into the logged-in state. In such a case, the job control part 66 requests the data processing part 65 for acquiring the data. The data processing part 65 starts establishing network communication in response to the request from the job control part 66. The data processing part 65 connects to the destination in accordance with the destination information 71 updated in advance and sends the authentication information 23 saved in advance, thereby automatically logging into the cloud service to be used by the user. As a result, the list of the data stored in the user's account is displayed on the operational panel 8. As the data to download is selected from the list of the data by the user, the data processing part 65 starts download of the selected data. The data processing part 65 then outputs the data acquired from the cloud service to the job control part 66. The user, therefore, is not required to enter the destination information 71 or the authentication information 23 for the information processing device 2 to connect to the cloud service by manual. The user is allowed to download the data from the cloud service normally used by the user easily by just giving the instruction to acquire the data from the outside. It is similar for storing the data downloaded from the cloud service in the BOX 55.

Figure 8:
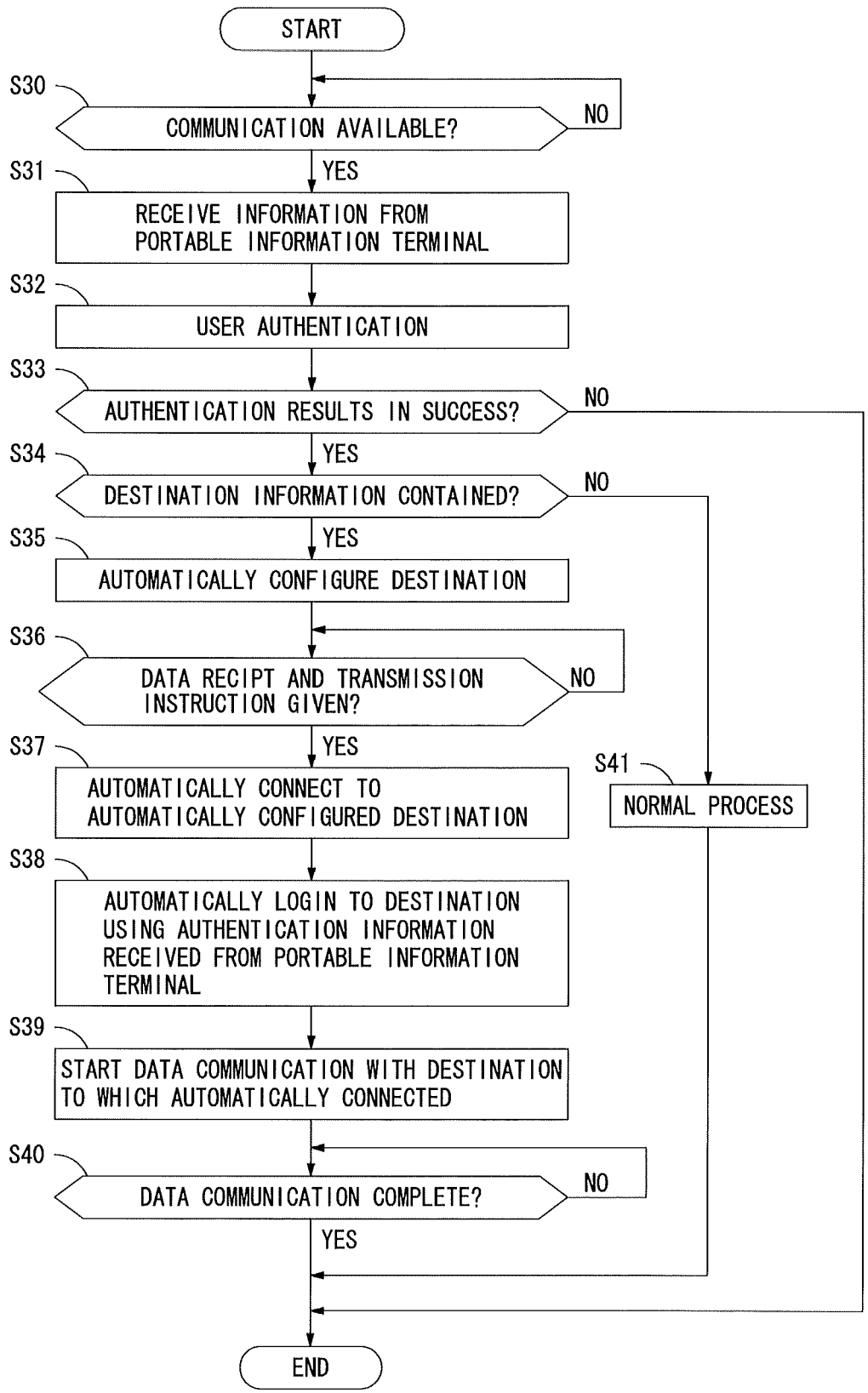
FIG. 8 is a flow diagram explaining an exemplary sequential procedure of the process performed on the information processing device.

FIG. 8 is a flow diagram explaining an exemplary sequential procedure of the process performed on the information processing device 2 as described above. The information processing device 2 constantly monitors whether or not the short distance wireless communication with the portable information terminal 3 becomes available (step S30). When the short distance wireless communication with the portable information terminal 3 becomes available (when a result of step S30 is YES), the information processing device 2 receives the information from the portable information terminal 3 (step S31). The information thereby received contains at least the user information 24. The information processing device 2 cross-checks the user information 24 with the user registration information 54, thereby performing user authentication (step S32). The information processing device 2 then determines whether or not the user authentication results in success (step S33). If the user authentication results in failure (when a result of step S33 is NO), the information processing device 2 completes the process without entering the logged-in state.

If the user authentication results in success (when a result of step S33 is YES), the information processing device 2 puts its operation state into the logged-in state. The information processing device 2 then determines whether or not the destination information 71 is contained in the information received from the portable information terminal 3 (step S34). With the destination information 71 contained (when a result of step S34 is YES), the information processing device 2 automatically configures in advance the destination to connect for the network communication based on the destination information 71 (step S35). After detecting the data transmission instruction from the logged-in user (when a result of step S36 is YES), the information processing device 2 connects to the destination which is automatically configured in advance over the network 5 (step S37). The information processing device 2 automatically logs in to the destination using the saved authentication information 23 which is received together with the destination information 71 from the portable information terminal 3 (step S38). More specifically, the information processing device 2 automatically logs in to the cloud service the same as that used by the application 31 running in the foreground on the portable information terminal 3 with which the short distance wireless communication is available. The user is not required to enter the destination information 71 or the authentication information 23 to the information processing device 2 by manual, so that the operability of the information processing device 2 improves.

After automatically logging into the cloud service, the information processing device 2 starts the data communication with the cloud service which is the destination to connect in response to the logged-in user's instruction (step S39). More specifically, the information processing device 2 starts data communication to upload the data to the cloud service and/or to download the data in the cloud service in response to the logged-in user's instruction. The information processing device 2 executes the job specified by the logged-in user by activating functions such as scan or print function in response to the logged-in user's instruction. After completion of the data communication (when a result of step S40 is YES), the information processing device 2 returns its operation state to the logged-out state from the logged-in state in response to the logged-in user's instruction and completes the process.

When the user authentication results in success and the information received from the portable information terminal 3 at entering the logged-in state does not contain the destination information 71 (when a result of step S34 is NO), the information processing device 2 is not allowed to automatically configure the destination to connect. The information processing device 2, therefore, performs the normal process (step S41) in response to the logged-in user's instruction. For the normal process, when the logged-in user would like to connect the information processing device 2 to the cloud service, he or she is required to enter the destination information 71 and the authentication information 23 to the information processing device 2 by making manual operation to the operational panel 8, for example. Even in this case, however, the logged-in user operates the portable information terminal 3 to start up the application 31 which uses the cloud service in the foreground, and the destination information 71 and the authentication information 23 may be sent to the information processing device 2 from the portable information terminal 3 in response to the start-up. When receiving the destination information 71 and the authentication information 23 from the portable information terminal 3 during the normal process (step S41), the information processing device 2 may terminate the normal process (step S41) and perform the above-described process in step S35 to S40. In response to the instruction to log-out by the logged-in user, the information processing device 2 returns its operation state to the logged out state from the logged-in state based on the instruction and completes the process.

Figure 9:
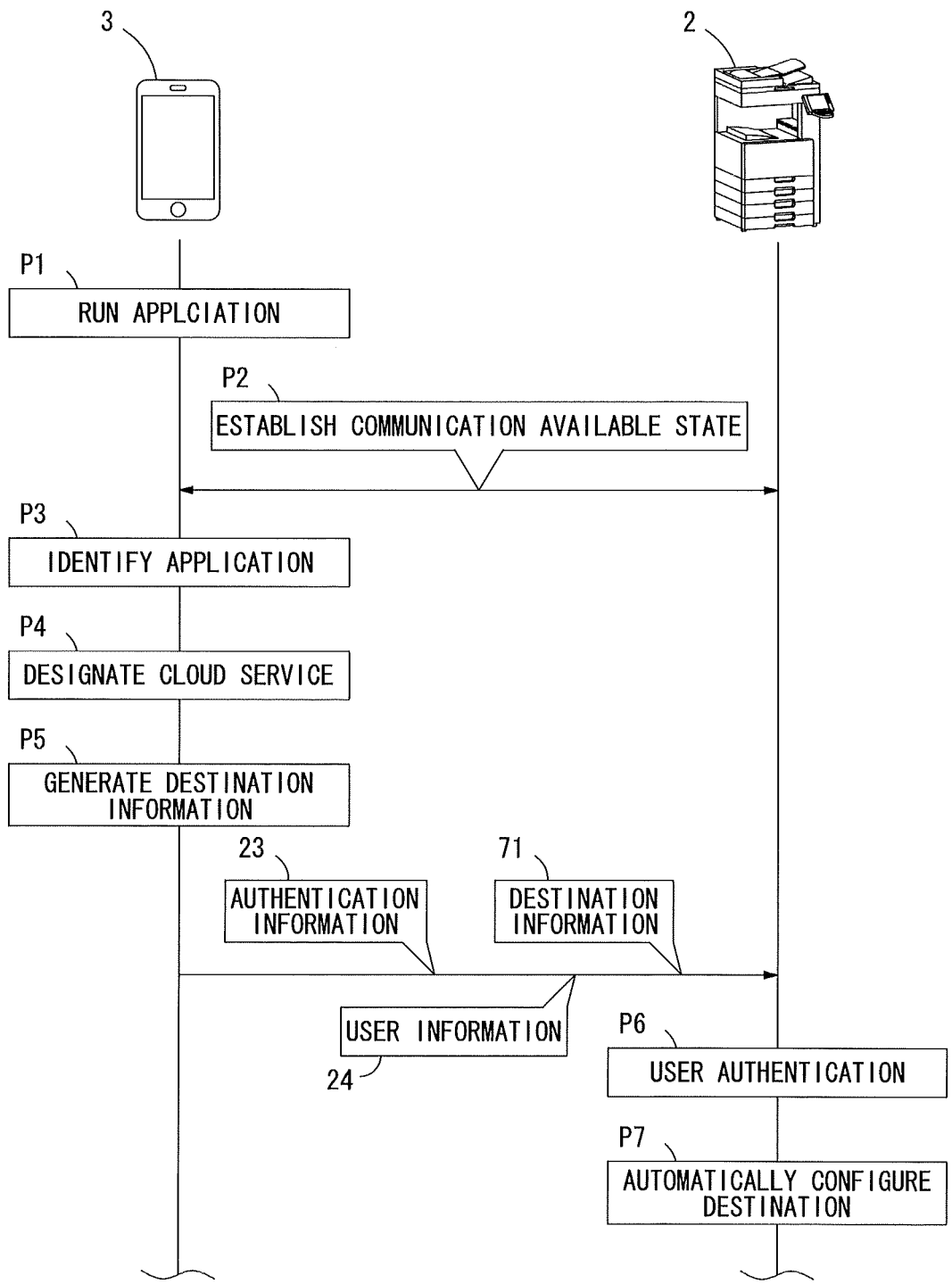
FIG. 9 is the exemplary sequence diagram of each process performed by the portable information terminal and the information processing device in cooperation with each other.

FIG. 9 is the exemplary sequence diagram of each process performed by the portable information terminal 3 and the information processing device 2 in cooperation with each other. As shown in FIG. 9, the portable information terminal 3 runs the application 31 which uses the cloud service in response to the user's instruction (process P1). The user then moves the portable information terminal 3 closer to the information processing device 2, and the portable information terminal 3 and the information processing device 2 establish communication state allowing the short distance wireless communication therebetween (process P2). As detecting the establishment of the state allowing the communication with the information processing device 2, the portable information terminal 3 identifies the application 31 running in the foreground (process P3). The portable information terminal 3 also detects the cloud service used by the application 31 (process P4). The portable information terminal 3 then generates the destination information 71 required for the information processing device 2 to connect to the cloud service used by the application 31 (process P5) and sends the generated destination information 71 to the information processing device 2. The portable information terminal 3 sends the authentication information 23 and the user information 24 to the information processing device 2 together with the destination information 71.

After receiving the destination information 71, the authentication information 23 and the user information 24 from the portable information terminal 3 through the short distance wireless communication, the information processing device 2 performs user authentication based on the user information 24 (process P6). When the user authentication results in success, the information processing device 2 automatically configures the destination to connect for network communication in accordance with the destination information 71 received from the portable information terminal 3 (process P7). The authentication information 23 received from the portable information terminal 3 is used for automatically connecting to the destination over the network 5. The authentication information 23 is, therefore, associated with the destination and saved.

The information processing device 2 then automatically and directly connects to the cloud service that is usually used by the user to upload and/or download in response to the user's instruction. On the information processing system 1 of the present preferred embodiment, the data to upload to the cloud service or the data to download from the cloud service is not required to be once stored in the portable information terminal 3, resulting in improvement of user-friendliness. Also, there is no need for the user to enter the destination information 71 and the authentication information 23 to connect to the cloud service to the information processing device 2 by manual operation, so that the operability in upload and download extremely improves.

As described above, the portable information terminal 3 on the information processing system 1 detects the cloud service to which the application 31 run on the portable information terminal 3 connects over the network 5 and associates the application 31 and the cloud service with each other to manage. Once the communication with the information processing device 2 becomes available, the portable information terminal 3 identifies the application 31 running then and generates the destination information 71 for the information processing device 2 to use the cloud service the same as that used by the application 31. The portable information terminal 3 sends the generated destination information 71 to the information processing device 2. The information processing device 2 automatically configures the destination to connect to the cloud service the same as that used by the application 31 running on the portable information terminal 3 in accordance with the destination information 71 received from the portable information terminal 3 while the communication with the portable information terminal 3 is available. The information processing device 2 then automatically connects to the cloud service over the network 5 based on the destination automatically configured in advance to send and receive the data from the cloud service.

According to the present preferred embodiment, it is not necessary to register in advance the information such as that as to the cloud service used by each user with the information processing device 2. When each user would like to connect the information processing device 2 directly to the cloud service to send and receive data directly from the cloud service, he or she just starts the application 31 to connect to the cloud service up on the portable information terminal 3 which is normally used by him or her and causes the portable information terminal 3 to establish communication with the information processing device 2 with running the application 31. In the present preferred embodiment, therefore, the operability of the user to cause the information processing device 2 to directly connect to the cloud service is improved. The direct data communication between the information processing device 2 and the portable information terminal 3 becomes available with user's simple operation.

The portable information terminal 3 of the present preferred embodiment stores therein the authentication information 23 required to use the cloud service. When sending the destination information 71 required connecting to the cloud service to the information processing device 2, the portable information terminal 3 reads the authentication information 23 corresponds to the cloud service and sends the read authentication information 23 to the information processing device 2. The information processing device 2 connects to the destination which is automatically configured in accordance with the destination information 71. At the connection, the information processing device 2 automatically logs into the cloud service with the authentication information 23 received together with the destination information 71. The authentication information 23 necessary for log-in to the user-specific account of the cloud service is not required to be entered by the user by manual when he or she connects the information processing device 2 to the cloud service to use. As a result, the operability further improved.

The portable information terminal 3 of the present preferred embodiment stores therein the user information 24 which is the information regarding the user registered in advance with the information processing device 2. Once the communication with the information processing device 2 becomes available, the portable information terminal 3 sends the user information 24 to the information processing device 2. The information processing device 2 performs user authentication to authenticate whether or not the user of the portable information terminal 3 is registered in advance based on the user information 24 received from the portable information terminal 3. For the use of the information processing device 2 by the user, the user authentication is automatically performed on the information processing device 2 by just establishing the communication between the portable information terminal 3 and the information processing device 2. The operation load applied on the user at the user authentication to use the information processing device 2 is reduced.

The information processing device 2 automatically configures the destination to connect to the cloud service if the user is successfully authenticated by the user authentication. When the user of the portable information terminal 3 is not the one registered in advance, the information processing device 2 does not automatically configure the destination to connect to the cloud service. As a result, it may prevent the information processing device 2 from being used by unauthorized users.

The portable information terminal 3 of the present preferred embodiment identifies the application 31 running in the foreground of the plurality of running applications 31, 32 and 33 as the communication with the information processing device 2 becomes available. The portable information terminal 3 generates the destination information 71 for the information processing device 2 to connect to the cloud service which is connected by the application 31 thereby identified. Even when the plurality of applications 31, 32 and 33 are running on the portable information terminal 3, the user selects the application 31 which uses the cloud service to which he or she would like to connect the information processing device 2 and configures the selected application 31 as the foreground application. As a result, the information processing device 2 is allowed to automatically connect to the cloud service the same as that used by the application 31.

The management part 41 which associates the application and the cloud service with each other and manages them on the portable information terminal 3 serves as the transmissive proxy in use for the network communication established by each application. The management part 41 resides in the portable information terminal 3 to detect the destination to connect for each application to start the network communication and determine whether or not the destination is the cloud service. If the destination is the cloud service as a result of the determination, the application and the cloud service are associated with each other and are managed. As described above, the application which uses the cloud service may be detected among from the variety of applications run on the portable information terminal 3 and the detected application and the cloud service are allowed to be associated with each other. Especially, even when the application connecting to the cloud service is not the specialized application and is one of the widely used applications, the widely used application and the cloud service are allowed to be associated with each other and managed.

As described above, the operability of the user to connect the information processing device to the cloud service which is usually used by him or her through the portable information terminal is improved. The data is allowed to be sent and received directly between the infatuation processing device and the portable information terminal without any bothersome manual operation.

(Modifications)

While the preferred embodiment of the present invention has been described above, the present invention is not limited to the preferred embodiment. Various modifications may be applied to the present invention.

In the present preferred embodiment described above, the information processing device 2 is shown to be one of MFPs with multiple functions such as scan function, print function and BOX function, for example. The information processing device of the present invention is not necessarily the device such as the MFPs including multiple functions. To be more specific, the information processing device of the present invention may be a device with single function such as devices including a specialized scan device with a function to send the image date generated by reading the document to the outside over the network, or a specialized fax device with a function to produce a printed output based on the image data received from the outside over the network. Alternatively, the information processing device may be a network storage connected to a network such as LAN in the office.

In the above-described present preferred embodiment, the management part 41 manages the management table TB1 on the portable information terminal 3. The information as to the cloud service (the cloud service name D1, the destination address D2 and the address for information processing device D3) is registered in advance by the user with the management table TB1. The information is, however, not necessarily registered in advance by the user with the management table TB1. To be more specific, for example, the management part 41 detects the destination to which the application connects in response to the start of the network communication by the application running on the portable information terminal 3. As detecting the destination, the management part 41 may make an inquiry to a specific external server about whether or not the destination is the cloud service. The external server is installed as a server which provides a service as to the information processing device 2 on the internet, for instance. Information containing a whole host of information as to the cloud service which is available for the information processing device 2 by connecting to it over the network is registered in advance with the external server. The management part 41 makes an inquiry to the external server about the destination to which each application connects, so that determination as to whether or not the destination is the cloud service may be made. When the destination to which each application connects is the cloud service, the management part 41 may acquire the address for the information processing device 2 to connect to the cloud service (destination information 71) and save the address in the management table TB1, for example. As described above, the user of the portable information terminal 3 is not required to register in advance the information with the management table TB1, resulting in further improvement of operability.

In the above-described present preferred embodiment, when generating the destination information 71 on the portable information terminal 3, the destination information generation part 44 reads the address for information processing device D3 or the destination address D2 of the management table TB1 managed by the management part 41 and generates the destination information 71. The destination information 71 is not necessarily generated in this way. The external server which provides the service as to the information processing device 2 may be installed as described above. In such a case, by making an inquiry to the external server, the destination information generation part 44 may acquire the address for the information processing device 2 to connect to the cloud service (destination information 71) from the external server. In this case, the destination information generation part 44 detects the cloud service which is used by the application running in the foreground on the portable information terminal 3 based on the information managed by the management part 41. The destination information generation part 44 then notifies the external server of the detected cloud service, thereby automatically acquiring the destination information 71 from the external server. As described above, the user of the portable information terminal 3 is not required to register in advance the address for information processing device D3 and/or the destination address D2 with the management table TB1, resulting in further improvement of operability.

In the above-described present preferred embodiment, in response to log-in to the user-specific account registered in advance after connecting to the cloud service, the data uploading to the cloud service becomes available. Some cloud services manage the user-specific account by an email address assigned to each user individually. Some of the cloud services allow the user to upload the data to the user's account of the cloud service by sending the email with the data attached to his or her assigned email address. In such a case, it is not necessary to log-in to the user-specific account to upload the data to the cloud service. The portable information terminal 3, therefore, is not necessarily sending the authentication information 23 to the information processing device 2. Also, in this case, the destination information 71 sent to the information processing device 2 from the portable information terminal 3 is the email address assigned to the user by the cloud service. When the destination information 71 received from the portable information terminal 3 is the email address, the information processing device 2 creates in advance an email setting the email address as the receiver.

In the above-described present preferred embodiment, a cloud service is provided by a service providing server 4. Alternatively, the multiple service providing servers 4 may work together to provide the cloud service.

In the above-described present preferred embodiment, the portable information terminal 3 and the information processing device 2 establish the short distance wireless communication such as NFC. It is not limited to the short distance wireless communication such as NFC, however. More specifically, the portable information terminal 3 and the information processing device 2 may establish communication over the network such as LAN.

What is claimed is:

1. An information processing system comprising an information processing device and a portable information terminal that allow communication therebetween, each of said information processing device and said portable information terminal using a cloud service of a plurality of cloud services over a network, wherein
said portable information terminal includes a hardware processor configured to:
detect a running application program run by an operating system of the portable information terminal, the running application program being one of a plurality of application programs stored in advance in the portable information terminal, each of the plurality of application programs connecting to a respective cloud service of the plurality of cloud services when being run by the operating system of the portable information terminal;
detect the cloud service to which said running application program connects and manage information of said running application program and the cloud service associated with each other;
generate destination information required for said information processing device to use the cloud service based on the information managed by the hardware processor of the portable information terminal; and
send said destination information to said information processing device while the communication with said information processing device by a short-range wireless communication, which is a different way from a communication way for said portable information terminal to use the cloud service, is available, and
said information processing device includes a hardware processor configured to:
automatically configure a connection destination to connect to the cloud service to be a same as that used by said running application program on said portable information terminal in accordance with said destination information received from said portable information terminal while the communication with said portable information terminal is available; and
connect to the cloud service to send and receive data based on the connection destination configured by the hardware processor of the information processing device, the information processing device sending and receiving data while the running application program continues to run on the portable information terminal using the cloud service.

2. The information processing system according to claim 1, wherein
said portable information terminal further includes an authentication information storage part for storing authentication information required to use the cloud service,
said hardware processor of said portable information terminal sends said authentication information to said information processing device together with said destination information, and
said hardware processor of said information processing device automatically logs into the cloud service using said authentication information which is received together with said destination information when connecting to the cloud service in accordance with the connection destination configured by said hardware processor of the information processing device.

3. The information processing system according to claim 1, wherein
said portable information terminal further includes a user information storage part for storing user information,
said hardware processor of said portable information terminal sends said user information to said information processing device after detecting that the communication with said information processing device is available,
said hardware processor of the information processing device is further configured to authenticate a user of said portable information terminal based on said user information received from said portable information terminal, and
said hardware processor of said information processing device automatically configures the connection destination to connect to the cloud service if the user is successfully authenticated.

4. The information processing system according to claim 1, wherein
said hardware processor of the portable information terminal identifies the application program running in the foreground when a plurality of said application programs are running on said portable information terminal, and
said hardware processor of the portable information terminal generates said destination information required for said information processing device to connect to the cloud service to which said application program identified by said hardware processor of the portable information terminal connects.

5. The information processing system according to claim 1, wherein
said hardware processor of the portable information terminal serves as a transmissive proxy when network communication is established and detects the cloud service in response to detection of a destination to which said application program connects.

6. The information processing system according to claim 5, wherein
said hardware processor of the portable information terminal generates said destination information based on the destination detected.

7. The information processing system according to claim 5, wherein
said hardware processor of the portable information terminal notifies an external server of the destination detected, thereby acquiring said destination information from the external server.

8. A portable information terminal capable of establishing communication with an information processing device from which data is sent and received, said portable information terminal being allowed to use a cloud service of a plurality of cloud services over a network by running an application, comprising a hardware processor configured to:
detect a running application program run by an operating system of the portable information terminal, the running application program being one of a plurality of application programs stored in advance in the portable information terminal, each of the plurality of application programs connecting to a respective cloud service of the plurality of cloud services when being run by the operating system of the portable information terminal;
detect the cloud service to which said running application program connects and manage information of said running application program and the cloud service associated with each other;
generate destination information required for said information processing device to use the cloud service based on the information managed by said hardware processor; and
send said destination information to said information processing device while the communication with said information processing device by a short-range wireless communication, which is a different way from a communication way for said portable information terminal to use the cloud service, is available, thereby causing said information processing device to automatically configure a connection destination to connect to the cloud service to be a same as that used by said running application program, the information processing device connecting to the cloud service to send and receive data based on the connection destination information while the running application program continues to run on the portable information terminal using the cloud service.

9. The portable information terminal according to claim 8, further comprising:
an authentication information storage part for storing authentication information required to use the cloud service, wherein
said hardware processor sends said authentication information to said information processing device together with said destination information.

10. The portable information terminal according to claim 8, further comprising:
a user information storage part for storing user information, wherein
said hardware processor sends said user information to said information processing device after detecting that the communication with said information processing device is available.

11. The portable information terminal according to claim 8, wherein
said hardware processor identifies the application program running in the foreground when a plurality of said application programs are running on said portable information terminal, and
said hardware processor generates said destination information required for said information processing device to connect to the cloud service to which said application program identified by said hardware processor connects.

12. The portable information terminal according to claim 8, wherein
said hardware processor serves as a transmissive proxy when network communication is established and detects the cloud service in response to detection of a destination to which said application program connects.

13. The portable information terminal according to claim 12, wherein
said hardware processor generates said destination information based on the destination detected.

14. The portable information terminal according to claim 12, wherein
said hardware processor notifies an external server of the destination detected, thereby acquiring said destination information from the external server.

15. An information processing device capable of establishing communication with a portable information terminal, said information processing device being connected to a network, thereby accessing a cloud service of a plurality of cloud services over the network to upload or download data, the information processing device comprising a hardware processor configured to:
receive information from said portable information terminal while the communication with said portable information terminal by a short-range wireless communication, which is a different way for said information processing device to access the cloud service, is available;
automatically configure a destination to connect over the network in accordance with destination information when the information received by said hardware processor contains the destination information required to connect to the cloud service being a same as that used by a running application program on said portable information terminal; and
connect to the cloud service the same as that used by said running application program on said portable information terminal in accordance with the destination information configured by said hardware processor to send and receive data from the cloud service, the information processing device sending and receiving data while the running application program continues to run on the portable information terminal using the cloud service.

16. The information processing device according to claim 15, wherein
said hardware processor automatically logs into the cloud service using authentication information when connecting to the cloud service in accordance with the destination configured by said hardware processor if the information received by said hardware processor contains said authentication information required to use the cloud service.

17. The information processing device according to claim 15, further comprising:
a storage part for storing therein user registration information regarding a user registered in advance; and
the hardware processor further configured to authenticate the user of said portable information terminal by crosschecking user information with said user registration information when the information received by said hardware processor contains said user information, wherein said hardware processor automatically configures the destination to connect to the cloud service if the user is successfully authenticated.

18. A non-transitory computer readable recording medium on which a program is recorded, said program executable on a portable information terminal capable of connecting to a cloud service of a plurality of cloud services over a network by running an application with an operating system, said program causing said portable information terminal to establish communication with an information processing device from which data is sent and received, thereby controlling said information processing device, said program executed on said portable information terminal to function as a system comprising:

an application detection part for detecting said application program being run by said operating system of the portable information terminal, the running application program being one of a plurality of application programs stored in advance in the portable information terminal, each of the plurality of application programs connecting to a respective cloud service of the plurality of cloud services when being run by the operating system of the portable information terminal;

a management part for detecting the cloud service to which said application program connects and managing information of said application program and the cloud service associated with each other;

a destination information generation part for generating destination information required for said information processing device to use the cloud service based on the information managed by said management part; and a transmission part for sending said destination information to said information processing device while the communication with said information processing device by a short-range wireless communication, which is a different way from a communication way for said portable information terminal to use the cloud service, is available, thereby causing said information processing device to automatically configure a connection destination to connect to the cloud service being a same as that used by said application program being run by said operating system, the information processing device connecting to the cloud service to send and receive data based on the connection destination information while the running application program continues to run on the portable information terminal using the cloud service.

19. The non-transitory computer readable recording medium according to claim 18, wherein said operating system manages authentication information required to use the cloud service, said destination information generation part acquires said authentication information from said operating system in generation of said destination information, and said transmission part sends said authentication information to said information processing device together with said destination information.

20. The non-transitory computer readable recording medium according to claim 18, said program executed on said portable information terminal to function as the system further comprising:

a user information management part for managing user information required to use said information processing device, wherein said transmission part acquires said user information from said user information management part and sends it to said information processing device after detecting that the communication with said information processing device is available.

21. The non-transitory computer readable recording medium according to claim 18, wherein said application detection part identifies the application program being run in the foreground by said operating system when a plurality of said application programs are run by said operating system, and said destination information generation part generates said destination information required for said information processing device to connect to the cloud service to which said application program identified by said application detection part connects.

22. The non-transitory computer readable recording medium according to claim 18, wherein said management part which serving as a transmissive proxy when said application program establishes network communication detects the cloud service in response to detection of a destination to which said application program connects.

23. The non-transitory computer readable recording medium according to claim 22, wherein said destination information generation part generates said destination information based on the destination detected by said management part.

24. The non-transitory computer readable recording medium according to claim 22, wherein said destination information generation part notifies an external server of the destination detected by said management part, thereby acquiring said destination information from the external server.

25. The information processing system according to claim 1, wherein the operating system is configured to run the plurality of application programs simultaneously, the operating system setting one of the plurality of application programs as a foreground application and setting at least one remaining application program of the plurality of application programs as a background application, and the foreground application being detected as the running application.

* * * * *